UNITED STATES PATENT OFFICE.

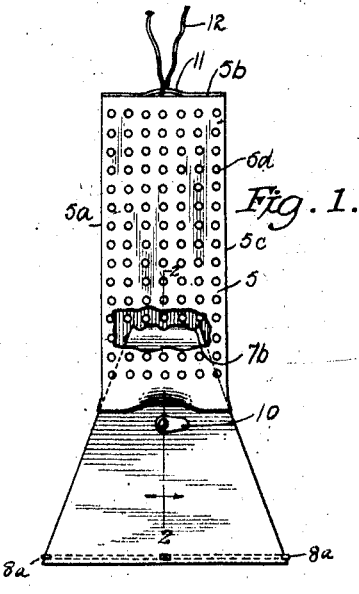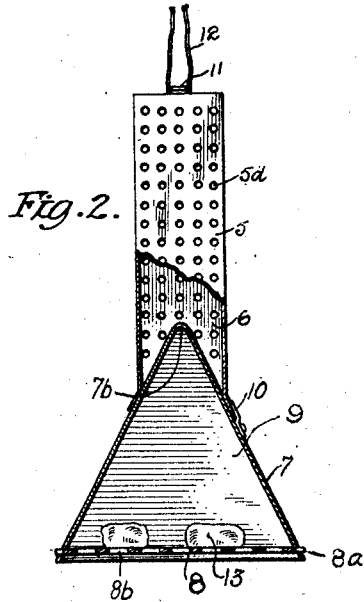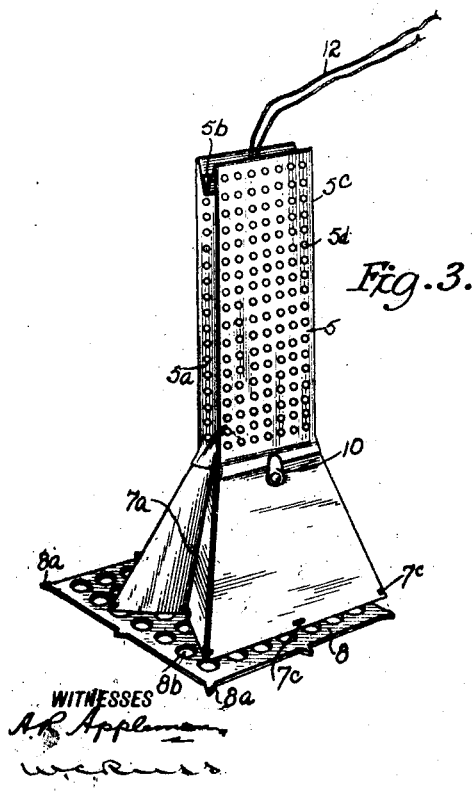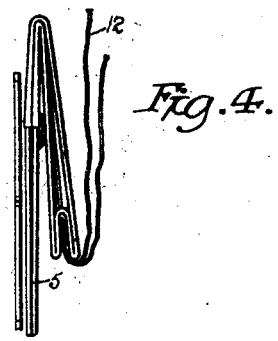

PATRICK CURRAN, OF CHICAGO HEIGHTS, ILLINOIS.

FLYTRAP.

1,333,470.   Specification of Letters Patent.   Patented Mar. 9, 1920.

Application filed August 6, 1919. Serial No. 315,751.

*To all whom it may concern:*

Be it known that I, PATRICK CURRAN, a citizen of the United States, and a resident of Chicago Heights, in the county of Cook and State of Illinois, have invented certain new and useful Improvements in Flytraps, of which the following is a specification.

The present invention relates to fly traps or catchers, and has reference particularly to an ornamental and collapsible device of this character, especially well suited for use in the household, and in restaurants, hospitals, and other establishments in which it is desirable to rid the premises of flies, by means effective and sanitary in operation and not unsightly in appearance.

The chief object of this invention is to provide a fly trap or catcher which will be effective and sanitary in operation, and pleasing in appearance, and which may be produced at small cost.

A further object of the invention is to provide a device of the character indicated, constructed of paper or other suitable material, and designed to be collapsible, and capable of being folded for convenience and economy in shipping and storage, and also for the purpose of killing the flies, if it is desired to destroy them in this manner. The invention comprises novel features of design, construction and arrangement or combination of parts, the embodiment of which illustrated and described in the drawings, specification, and appended claims, is the form preferred for the purposes of illustration. But it should be understood that the invention is not limited to such form, and that the details thereof may be varied without departing from the objects and scope of the invention.

Reference is to be had to the accompanying drawings, in which similar characters indicate corresponding parts throughout the several views, and in which—

Figure 1 is a side view in elevation, of the trap, having a section of the perforated column broken away to expose the top of the pyramidal base member projecting into the interior of the column, and also showing the apertures in the top of said base member;

Fig. 2 is a front view in elevation, of the trap, partly in section along the line 2—2, Fig. 1, showing part of the perforated column, and the pyramidal base member, with the bottom plate or bait-receptacle attached;

Fig. 3 is a perspective view of the trap, partly folded, and illustrates the construction of the perforated bottom plate or bait receptacle; and Fig. 4 is a front view in elevation of the trap, collapsed and folded.

Referring to the drawings, the trap comprises, essentially, a column 5 forming an upper chamber 6, a pyramidal shaped base member 7 forming a lower chamber 9, and a bottom plate or bait-receptacle 8.

The trap is made, preferably, of paper throughout, although any other suitable material capable of being folded, may be used for the trap proper, and tin, aluminum, or other cheap and light metals may be employed for the base.

The column 5 is creased inwardly along its sides $5^a$, $5^b$ and $5^c$, to permit of its being collapsed, and it is provided on all sides with a plurality of apertures, $5^d$, for the purpose of admitting light into the upper chamber 6, said apertures being of a size sufficiently small to prevent the escape of the trapped flies. The sides of the column 5, near the lower edges, are creased and bent inwardly and outwardly as required, to conform to the outer contour of the upper part of the base member 7 to which the said column 5 is secured by means of fasteners 10. The top of the column 5 is provided with a loop or eye 11, through which cord or wire 12 is passed, for suspending the trap from the ceiling or from the walls of a room.

The base member 7 in the form shown is substantially pyramidal in shape, and its sides are creased as at $7^a$, to conform to the creased sides of column 5, permitting both the said column and base to be collapsed as shown in Fig. 4. At the top of the base member 7, a plurality of apertures $7^b$ is provided, sufficiently large so that the flies may pass from the lower chamber 9 to the upper chamber 6. Near the lower edges of the base member 7 are small slots or cuts $7^c$, for the purpose hereinafter described.

The bottom plate or bait-receptacle 8 has a plurality of apertures $8^b$, large enough to admit flies into the lower chamber, and it is provided at its edges with a series of projecting points $8^a$, adapted to be fitted into the slots or cuts $7^c$, near the bottom edges of the base member 7, for the purpose of securing the said bottom plate in place. The plate 8, when in position, serves not only as the bottom of the trap, and as a receptacle for the bait 13, but also to open out the superstructure, and to hold it in a distended position.

As the operation of the trap has already been indicated in the foregoing description, it will suffice to say that before the trap is put together, a suitable bait 13 is placed on the bottom plate 8. The trap proper is then opened out and secured over the said bottom plate 8, by means of the points 8ª and slots 7ᶜ. The flies enter the lower chamber 9 of the trap, through the apertures 8ᵇ in plate 8, being attracted thereto by the bait, and as the lower chamber 9 is comparatively dark, the flies have a tendency to enter the upper chamber 6, through apertures 7ᵇ, the said chamber 6 being comparatively light, receiving light through the apertures 5ᵇ. As already indicated, the trap may be suspended from a small hook in the ceiling or the wall of a room, by means of the cord or wire 12.

Having thus described my invention, I claim as new, and desire to secure by Letters Patent:—

1. A collapsible fly trap of the character described, comprising a collapsible column forming a chamber adapted to receive light through a plurality of relatively small apertures in the walls of said column, an opaque collapsible base member forming a second chamber, adjacent said first mentioned chamber, the top of said base member projecting into said column, and said chambers communicating through apertures in the top of said base member, a perforated bottom plate for said base member adapted to be detachably secured thereto, means for fastening said base member to said column, and means for securing the bottom plate to said base member.

2. A collapsible fly trap of the character described, comprising, in combination a collapsible upper member forming a chamber adapted to receive light through a plurality of relatively small apertures in the walls of said member, an opaque collapsible lower member, the top of which projects into said upper member, a plurality of relatively large openings in the top of said lower member, means for fastening said upper and lower members together, and a bottom plate having relatively large apertures and provided with a series of laterally projecting points fitting corresponding slots in said lower member, for securing said bottom plate in position.

PATRICK CURRAN.